(12) United States Patent
Ford (10) Patent No.: US 10,711,653 B2
(45) Date of Patent: Jul. 14, 2020

(54) PROCESS AND SYSTEM FOR EXTRACTING USEFUL WORK OR ELECTRICITY FROM THERMAL SOURCES

(71) Applicant: BOUNDARY TURBINES INC, Spruce Grove (CA)

(72) Inventor: Darrell Ford, Spruce Grove (CA)

( * ) Notice: Subject to any disclaimer, the term of this patent is extended or adjusted under 35 U.S.C. 154(b) by 23 days.

(21) Appl. No.: 16/066,662

(22) PCT Filed: Dec. 28, 2016

(86) PCT No.: PCT/CA2016/051545
§ 371 (c)(1),
(2) Date: Jun. 27, 2018

(87) PCT Pub. No.: WO2017/113014
PCT Pub. Date: Jul. 6, 2017

(65) Prior Publication Data
US 2019/0010834 A1    Jan. 10, 2019

Related U.S. Application Data

(60) Provisional application No. 62/271,630, filed on Dec. 28, 2015.

(51) Int. Cl.
*F01K 27/00* (2006.01)
*F01K 25/08* (2006.01)
(Continued)

(52) U.S. Cl.
CPC ............... *F01K 27/00* (2013.01); *F01K 7/10* (2013.01); *F01K 7/32* (2013.01); *F01K 13/02* (2013.01);
(Continued)

(58) Field of Classification Search
CPC ........ F01K 25/08; F01K 25/10; F01K 25/103; F01K 13/00; F01K 13/02; F01K 7/10;
(Continued)

(56) References Cited

U.S. PATENT DOCUMENTS 4,255,934 A * 3/1981 Stephenson ........... F01K 21/005
60/655
5,272,879 A * 12/1993 Wiggs ..................... F01K 25/08
60/676

(Continued)

FOREIGN PATENT DOCUMENTS

CA          1065841       6/1979

*Primary Examiner* — Mark A Laurenzi
*Assistant Examiner* — Xiaoting Hu (57) ABSTRACT

A process and system of extracting useful work or electricity from a thermal source, wherein heat energy from the thermal source is used in the form of a heated collection fluid; a first side of a heat exchanger is filled with a liquid or supercritical working fluid; fluid flow out of the first side of the heat exchanger is closed such that a fixed volume of the working fluid is maintained in the first side; the heated collection fluid flowed through a second side of the heat exchanger that is adjacent to the first side to affect a transfer of heat from the heated collection fluid to the fixed volume of the working fluid to raise its temperature and pressure; the pressurized working fluid is released from the first side of the heat exchanger upon the working fluid reaching a threshold state; a flow of the pressurized working fluid is directed to an expander capable of converting the kinetic energy of the pressurized working fluid into useful work or electricity; and the foregoing steps are repeated. A plurality of such operably coupled heat exchangers may be used in a manner such that the timing of the pressurized working fluid from each heat exchanger to the expander is offset.

15 Claims, 6 Drawing Sheets

(51) Int. Cl.
  *F03G 6/00* (2006.01)
  *F01K 7/10* (2006.01)
  *F01K 7/32* (2006.01)
  *F01K 13/02* (2006.01)
  *F03G 6/06* (2006.01)
  *F03G 7/04* (2006.01)
  *H02K 7/18* (2006.01)
  *F02G 1/04* (2006.01)

(52) U.S. Cl.
  CPC ............... *F01K 25/08* (2013.01); *F02G 1/04* (2013.01); *F03G 6/00* (2013.01); *H02K 7/1807* (2013.01); *H02K 7/1823* (2013.01); *F03G 6/067* (2013.01); *F03G 7/04* (2013.01); *Y02E 10/46* (2013.01); *Y02P 80/21* (2015.11)

(58) Field of Classification Search
  CPC ... F01K 7/32; F01K 27/00; F03G 6/00; F03G 6/005; F03G 6/067; F03G 7/04; F03G 7/05; F02G 1/04; F02G 5/00; F02G 5/02
  See application file for complete search history.

(56) References Cited

U.S. PATENT DOCUMENTS

| | | | | |
|---|---|---|---|---|
| 5,548,957 A | * | 8/1996 | Salemie | ............... F01K 25/02 60/641.8 |
| 2005/0076639 A1 | * | 4/2005 | Shirk | ............... F01K 25/08 60/520 |
| 2010/0059216 A1 | | 3/2010 | Bruckmann et al. | |
| 2014/0117670 A1 | * | 5/2014 | Freund | ............... F01K 13/02 290/52 |

* cited by examiner

| OHPC Power Cycle - R134a Working Fluid | | | | | | | |
|---|---|---|---|---|---|---|---|
| Cycle Location | Temperature (°F) | Pressure (psig) | Density (lbm/ft³) | Volume (ft³/lbm) | Int. Energy (Btu/lbm) | Enthalpy (Btu/lbm) | Quality (lbm/lbm) |
| At Inlet to Exchanger 19 (pre expansion) | 19.3 | 50.0 | 82.32 | 0.0121 | 81.9 | 82.0 | Subcooled |
| Inside Exchanger 19 (post expansion) | 35.1 | 1197 | 82.29 | 0.0122 | 85.2 | 87.9 | Subcooled |
| At outlet of Expander 12 | 16.5 | 16.0 | 22.51 | 0.0444 | 82.7 | 83.0 | 0.021487 |
| At inlet to Reservoir 15 | 16.5 | 16.0 | 82.29 | 0.0122 | 81.0 | 81.1 | Subcooled |
| At Exit of Compressor 1 | 19.3 | 50.0 | 82.32 | 0.0121 | 81.9 | 82.0 | Subcooled |

| Cooling Circuit - R134a - Refrigeration/Cooling | | | | | | | |
|---|---|---|---|---|---|---|---|
| Cycle Location | Temperature (°F) | Pressure (psig) | Density (lbm/ft³) | Volume (ft³/lbm) | Int. Energy (Btu/lbm) | Enthalpy (Btu/lbm) | Quality (lbm/lbm) |
| At inlet of Exchanger 18 | 146.3 | 250 | 8.39 | 0.1192 | 160.0 | 165.8 | 0.687 |
| At exit of Exchanger 18 | 120.0 | 250 | 69.49 | 0.0144 | 115.3 | 116.0 | Subcooled |
| At exit of PRV Valve 14 | 6.7 | 10 | 1.16 | 0.8625 | 115.3 | 119.3 | 0.45909 |
| At exit of Exchanger 3 | 6.7 | 10 | 0.55 | 1.8276 | 157.7 | 166.1 | 0.98 |
| At exit of Recuperator Compressor 2 | 146.3 | 250 | 8.39 | 0.1192 | 160.0 | 165.8 | 0.68714 |

| | Super Critical CO2 Working Fluid | | | | | | |
|---|---|---|---|---|---|---|---|
| | Temp (°F) | Pressure (psig) | Density (lbm/ft³) | Volume (ft³/lbm) | Int. Energy (Btu/lbm) | Enthalpy (Btu/lbm) | Cp (Btu/lbm-°R) | Quality |
| Cycle Location | | | | | | | | |
| HEX Inlet - LP | 70 | 1500 | 53.3 | 0.0188 | 100.07 | 105.34 | 0.624 | Subcooled |
| Charged HEX - HP | 180 | 6769.2 | 53.3 | 0.0188 | 124.06 | 147.63 | 0.425 | S/Critical |
| Expander Outlet | 61.7 | 750 | 21.32 | 0.0469 | 125.08 | 131.72 | Undefined | M-Phase |
| Compressor Inlet | 56.1 | 750 | 52.578 | 0.0190 | 98.0 | 100.69 | 0.747 | Subcooled |
| Compressor Outlet | 70 | 1500 | 53.3 | 0.0188 | 100.07 | 105.34 | 0.624 | Subcooled |

Fig. 6

PROCESS AND SYSTEM FOR EXTRACTING USEFUL WORK OR ELECTRICITY FROM THERMAL SOURCES

FIELD OF THE INVENTION

The present invention relates to a process for converting thermal energy into useful products such as mechanical work, electricity or space heating, and a power extraction system for use in the process. More particularly the present invention pertains to the field of clean power production and an emission-less power extraction systems and methods for use in converting thermal energy into electricity from sources such as solar, wind, waste heat, geothermal, natural water bodies (oceans, lakes, rivers), biomass oxidation and the like.

BACKGROUND OF THE INVENTION

There are numerous industrial and other processes that produce waste heat, particularly waste heat that is or can be converted to a heat source in the approximate range of 34° F. to 210° F. Heat in these low grade thermal ranges may also be obtained from geothermal sources, including man-made geothermal sources such as those occurring in abandoned oil and natural gas wells, as well as natural water bodies (oceans, lakes, rivers), solar and wind sources. Heat in this range is difficult to utilize since it is too low to be used in conventional Rankin cycle or other vapor cycles to generate useful energy. Accordingly, there is a need for a more efficient method of extracting useful work and electricity from heat, and particularly from heat from low grade thermal sources.

SUMMARY OF THE INVENTION

The present invention provides methods for utilizing a liquid or supercritical working fluid, which may be an organic fluid, refrigerant or $CO_2$, in such a way as to avoid complete phase change to vapor while effectively converting thermal energy into useful products such as mechanical work, electricity, or space heating. The present invention also provides power extraction systems and machinery for use in the method. An embodiment of the method or cycle comprises the employment of a working fluid, such as for example liquid R134a or R290, or liquid or supercritical $CO_2$, in a thermal circuit where the liquid or supercritical working fluid is first compressed to a target inlet pressure and at a relatively low temperature. The inlet liquid or supercritical working fluid is then directed to a heat exchanger until the heat exchanger is 'charged' with the working fluid. Once the heat exchanger is charged, the inlet and outlet of the heat exchanger are closed, and the working fluid is then heated while being volume restricted inside the heat exchanger. Heat from a thermal source, for example as collection fluid in the form of exhaust gases from combustion, or as a collection liquid heated from the thermal source, is flowed through the other side of the heat exchanger such that a transfer of thermal energy from the collection fluid or collection liquid into the working fluid takes places and causes a substantial increase in pressure and a nominal increase in temperature of the volume of working fluid within the heat exchanger. The outlet valve on the heat exchanger is then opened allowing the heated and high pressure working fluid to enter one or more expanders (for example, piston or rotary) where expansion is allowed to take place. As the working fluid expands in the expander, useful work is extracted to an output shaft and ideally to an electric generator. As work is extracted and expansion takes place, the working fluid returns to a low pressure state exiting the exhaust side of the expander. The working fluid may then travel through another heat exchanger to be further cooled by exchanging energy indirectly with a second cooling fluid, which may also be a fluid such as R134a or R225 or R290. The low pressure and cooled working fluid may be directed to a reservoir that is maintained at the target storage pressure and temperature. From the reservoir, the relatively low pressure, low temperature working fluid is sent to a compressor (or compressors) where the liquid is re-compressed to the desired pressure and temperature as required at the top of the cycle. The working cycle takes place without complete phase change of the working fluid or with a partial phase change taking place due to the expansion (about 5% to about 50% or less) of the working fluid as it exits the outlet of the expander.

Heat energy may be collected and stored in a thermal storage system consisting of an insulated storage container filled with water or a similar liquid where thermal energy in a range from about 34° F. to about 210° F. is transferred to storage liquid (or a water/chemical mixture such as an anti-freeze agent) from a variety of thermal sources such as natural water bodies (oceans, lakes, rivers), solar, wind to thermal, geothermal, waste heat from mobile or stationary processes, or in some cases, the oxidation of bio-mass or conventional type fuels.

A plurality of heat exchangers operating in the above described manner may be operably coupled to the expander such that the timing of the pressurized working fluid from each heat exchanger to the expander is offset to provide pulses of kinetic energy to the expander. As well, a plurality of expanders may be operably coupled to the heat exchanger or the plurality of exchangers.

Accordingly, in some aspects the present invention provides a process of extracting useful work or electricity from a thermal source, the process comprising the steps of: filling a first side of a first heat exchanger with a liquid or supercritical working fluid; closing fluid flow in and out of the first side of the first heat exchanger such that a fixed volume of the working fluid is maintained in the first side; providing a flow of a collection fluid, that is at a higher temperature than the working fluid as a result of heat from the thermal source, through a second side of the first heat exchanger that is adjacent to the first side to affect a transfer of heat from the collection fluid to the fixed volume of the working fluid to raise its temperature and pressure; releasing the pressurized working fluid from the first side of the first heat exchanger upon the working fluid reaching a threshold state; directing a flow of the pressurized working fluid to an expander capable of converting the kinetic energy of the pressurized working fluid into useful work or electricity; providing a cooling conduit comprising a cooling fluid circulating therein, a compressor that compresses the cooling fluid, a second heat exchanger downstream of the compressor, a pressure reduction valve downstream of the second heat exchanger that expands the cooling fluid, and a third heat exchanger downstream of the pressure reduction valve; directing a flow of the collection fluid through the second heat exchanger such that the collection fluid absorbs heat from the cooling fluid; and directing a flow of the working fluid after it exits the expander through the third heat exchanger such that the cooling fluid absorbs heat from the working fluid.

In some embodiments, the collection fluid is a collection liquid, and the process further includes transferring heat energy from the thermal source to the collection liquid. In some embodiments, collection liquid is heated to a temperature within the range of about 34° F. to about 210° F. to yield a heated collection liquid.

In some embodiments, the working fluid at prior to the filling of the first side of the exchanger is at a pressure in the range of about 50 to about 5000 psi and at a temperature in the range of about −10° F. to about 210° F.

In some embodiments, the working fluid becomes supercritical during step of being heated in the first side of the first heat exchanger, and after passing through the expander the working fluid is about 50% to about 90% or more in a liquid phase.

In some embodiments, the process further may comprise the step of recirculating the working fluid from the expander to the first side of the first heat exchanger.

In some embodiments, the process may further comprise the step of recirculating the collection liquid to the second side of the first heat exchanger.

In some embodiments, the working fluid is cooled to within the range of about −10° F. to about 210° F.

In some embodiments, the process may comprise performing the aforementioned steps on a plurality of first heat exchangers, each in fluid communication with the expander, and temporally offsetting the release of the pressurized working fluid from at least one of the plurality of first heat exchangers to the expander.

In some aspects, the present invention provides system for extracting useful work or electricity from a thermal source, the system comprising: a first heat exchanger having a first side and an adjacent second side that is fluidly separate from the first side; a supply of a liquid or supercritical working fluid that is fluidly coupled to the first side of the first heat exchanger; a valve system operable to close flow of working fluid in and out of the first side in response to a close signal to enclose a volume of working fluid within the first side, and being further operable to open flow of working fluid out of the first side in response to an open signal; a flow of a collection fluid through the second side of the first heat exchanger, wherein the collection fluid is at a higher temperature than the working fluid as a result of heat from the thermal source, the flow of collection liquid operable to affect a transfer of heat from the collection liquid to the volume of working liquid within the first side to raise its temperature and pressure; a controller operable to send the close signal to the valve system when the first side of the first heat exchanger is full of working fluid, and operable to send the open signal to the valve system upon the working fluid reaching a threshold state to release the pressurized working fluid from the first side of the first heat exchanger; an expander fluidly coupled to the first side of the first heat exchanger to receive the pressurized working fluid and operable to convert the kinetic energy of the pressurized working fluid into useful work or electricity; and a cooling conduit comprising: a cooling fluid circulating therein; a compressor that compresses the cooling fluid; a second heat exchanger in fluid communication with the cooling fluid downstream of the compressor and the collection fluid and operable to transfer heat from the cooling fluid to the collection fluid; a pressure reduction valve downstream of the second heat exchanger that expands the cooling fluid; and a third heat exchanger in fluid communication with the cooling fluid downstream of the pressure reduction valve and the working fluid downstream of the expander and operable to transfer heat from the working fluid to the cooling fluid.

In some embodiments, the working fluid may be at a pressure in the range of about 50 to about 5000 psi and at a temperature in the range of about −10° F. to about 210° F.

In some embodiments, the system may further comprise a first recirculation conduit to recirculate the working fluid from the third heat exchanger to the first side of the first heat exchanger.

In some embodiments, the third heat exchanger is operable to cool the working fluid to a temperature in the range of −10° F. to 210° F.

In some embodiments, the system may comprise a plurality of first heat exchangers, each having a first side that receives a flow of working fluid and a second side that receives a flow of collection fluid, and each first side being in fluid communication with the expander and operably connected to the valve system, and the controller is operable to send open signals to the valve system in a manner to temporally offset the release of pressurized working liquid from at least one of the plurality of first heat exchangers to the expander.

The foregoing is intended as a broad summary only and of only some of the aspects of the invention. It is not intended to define the limits or requirements of the invention. Other aspects of the invention will be appreciated by reference to the detailed description of the preferred embodiment.

BRIEF DESCRIPTION OF THE DRAWINGS

These and other features of the invention will become more apparent from the following description in which reference is made to the appended drawings and wherein.

DETAILED DESCRIPTION

Figure 1:
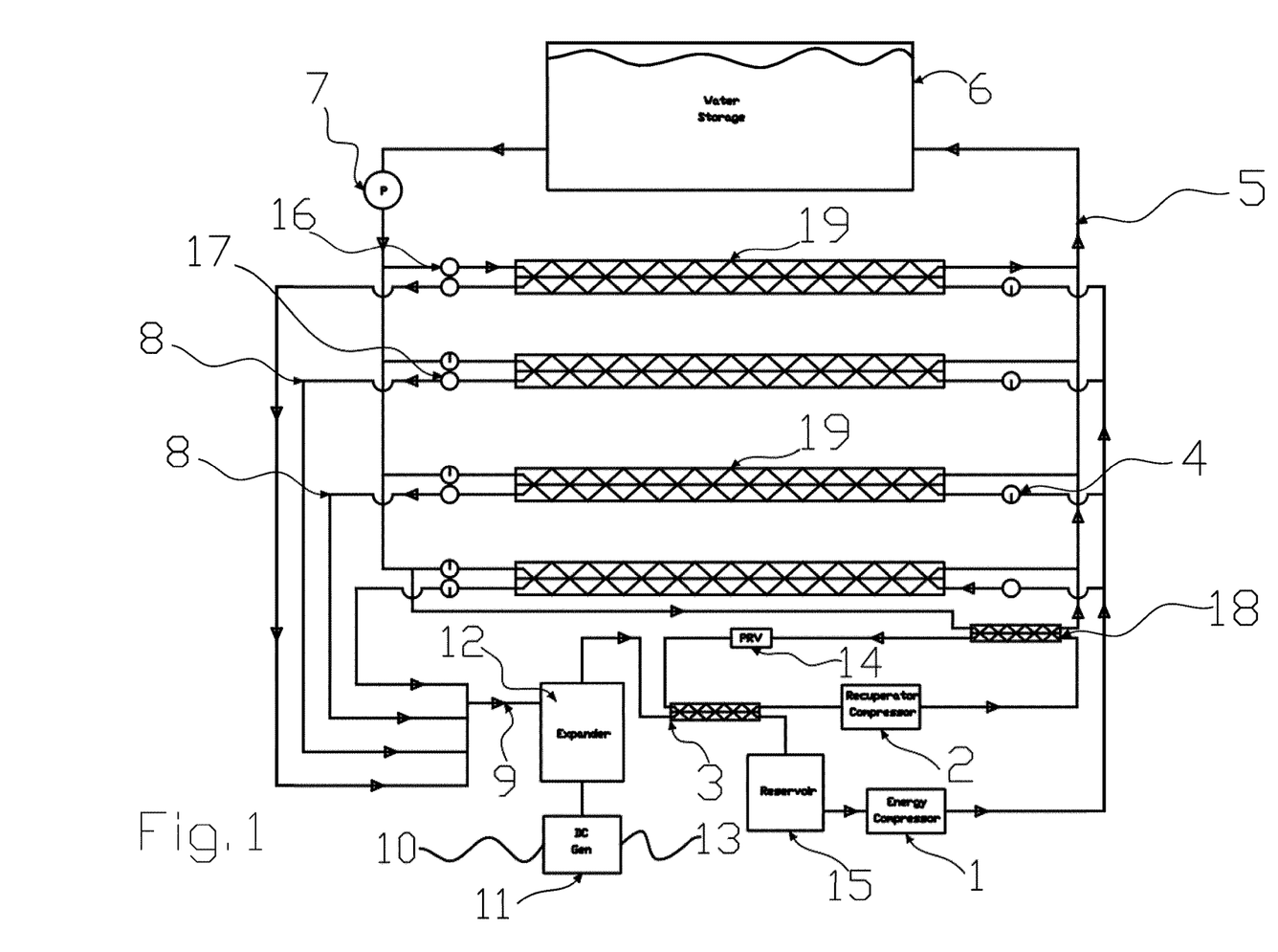
FIG. 1 is a process flow diagram of an emission-less power extraction system utilizing a hydraulic pulse cycle for the conversion of thermal energy into electricity from sources such as natural water bodies (oceans, lakes, rivers), solar, wind, waste heat, geothermal, biomass oxidation in conventional fuels according, to an embodiment of the present invention.
Figure 2:
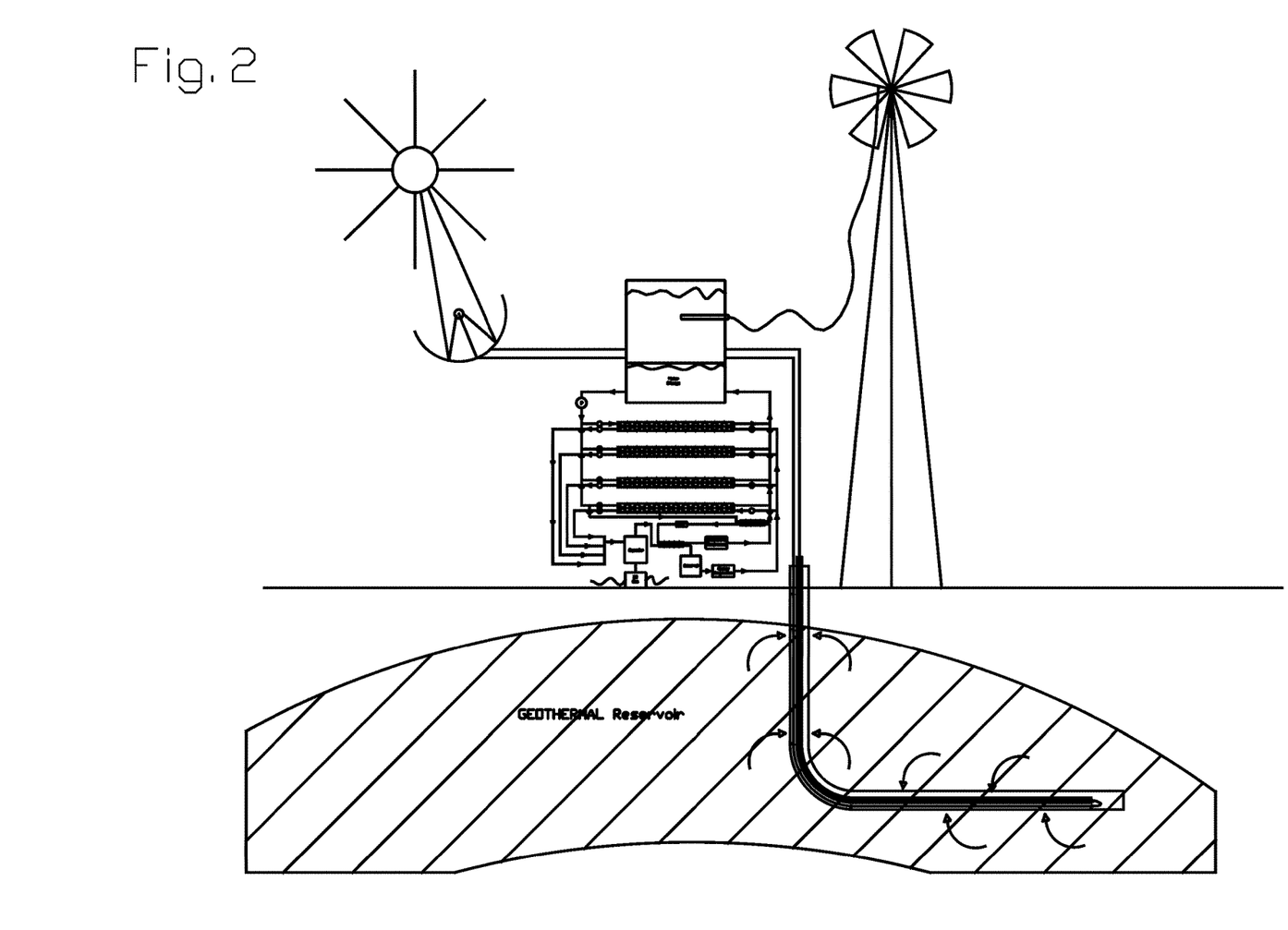
FIG. 2 is a schematic representative view of the system of FIG. 1 connected to various thermal heat sources such as geothermal, solar and wind.

Referring to FIG. 1 there is shown an embodiment of a hydraulic pulse cycle system for the conversion of thermal energy into electricity from sources such as natural water bodies (oceans, lakes, rivers), solar, wind, waste heat, geothermal, biomass oxidation. The system may extract useful work from thermal source, and particularly from a low grade thermal source capable of being delivered at temperatures in the range of about 34° F. to about 210° F. More specifically, the system may be used to extract useful work form thermal sources such as natural water bodies (oceans, lakes, rivers), solar, wind, waste heat, geothermal, biomass oxidation, as well as other sources of heat in these temperature ranges. However, the system may also be used to extract useful work from thermal sources having temperatures higher than 210° F.

A critical feature of the hydraulic pulse cycle of the present invention is in the unique employment of a three step power cycle involving three distinct and separated thermal and pressure stages: 1) charge/recharge; 2) pressurize; and 3) power. These three stages result in a 'pulsating' flow to the expander unit. For example, in the case of a system utilizing four heat exchangers as described herein—one heat exchanger is in power stage; one heat exchanger is in pressurize stage; one heat exchanger is in recharge stage; and one heat exchanger is in a ready or exhausted mode prior to recharge. A programmable logic controller (PLC) manages the timing of the valve system to effectively coordinate the cycles of the four heat exchanger units as needed to accommodate a steady and pulsing flow of pressurized working fluid to the expander. This pulsating characteristic results in the expander experiencing a rapidly swinging pressure gradient ranging from the high pressure of the cycle to the low pressure of the cycle—in this case about 1200 psi to about 15 psi—an average in this example of about 606 psi at the inlet to the expander. This pulsation characteristic also results in a corresponding pulsation of power output from the expander output shaft. To accommodate this unique feature, the system may employ DC generators sending DC electrical energy to DC batteries which are not negatively affected by the pulsation feature—which appears as a wave of amperage at a set voltage (controlled by a voltage regulator which looks at the shaft RPM and increases or decreases the load on the alternator windings as needed to maintain the target voltage as well as the shaft rpm). AC current is then drawn from the DC batteries via standard inverter equipment thereby delivering a very high quality AC power to the end use.

In FIG. 1, the working liquid begins the cycle from reservoir 15. During the charge phase of the cycle, working liquid travels to the first compressor 1, where it is compressed to desired heat exchanger inlet conditions—for example about 50 psi and about 19° F.—and then the working liquid then travels to the inlet of single or multiple heat exchangers 19, also referred to herein as a "first heat exchanger", via the working liquid inlet valves 4. The heat exchangers 19 have two fluidly separate sides as is known in the art. While the working liquid is entering (charging) one side of a particular heat exchanger 19, raising the pressure from approximately 16 psi to about 50 psi, the outlet valve 17 and the collection or storage fluid circuit valve 16 remain closed. Once the pressure reaches the desired level (about 50 psi in this case) the working liquid inlet valve 4 is closed to restrict the working fluid to a fixed volume.

During the pressurize phase of the cycle, the storage fluid inlet valve 16 is opened and the heat exchanger outlet valve 17 remains closed allowing the working liquid to absorb thermal energy from the storage fluid flowing in the other side of the heat exchanger, and thereby to experience a temperature increase while being restricted to a fixed volume in the heat exchanger 19, causing a pressure increase of the working liquid to about 1200 psi or more and its temperature to reach about 33-38° F. The given heat exchanger 19 is now storing potential energy, which is then released during the power or discharge phase of the cycle.

During the power phase, inlet valve 16 remains open and inlet valve 4 remains closed, but outlet valve 17 is opened to allow the high pressure working fluid to travel via the manifold system 8 to the inlet of the expander 9. The working liquid enters the expander 12 where expansion takes place and work is extracted, resulting in a pressure and temperature drop in the working liquid. Although the working liquid experiences significant expansion (approximately 2-8 times) with corresponding pressure and temperature drop, the working liquid remains in a substantially multi-phase phase state (about 50% to about 90% or greater liquid).

After the power phase, the working liquid then passes from the exhaust conduit of the expander 12 through the recuperator/cooler heat exchanger 3, also referred to herein as a "third heat exchanger", where the working liquid temperature is further reduced in internal energy to about 81 btu/lbm by transferring energy to the cooling fluid circuit. The working liquid then travels to the system reservoir 15, where it is stored for the repeat of the cycle.

The hydraulic pulse cycle system in FIG. 1 integrates three distinct circuits or loops: water as the energy storage and transfer medium (collection liquid); a working liquid used as a multi-phase expansion medium for the extraction of energy from the water; and a cooling/recuperator circuit employing a fluid, which may be the same kind of liquid as the working liquid or a different fluid could be used, to remove the unused energy from the bottom end of the working liquid loop (expanders are only 20-70% efficient) and to effectively re-set the working liquid temp and pressures as needed to be pumped back to the top of the working liquid loop (as required at inlet to each exchanger). The cooling/recuperator loop functions as a 're-set' function—it effectively salvages and then concentrates the energy extracted from the working liquid and delivers it back into the water/energy storage loop so that it is not wasted/lost from the energy balance. The cooling/recuperation loop is important to both the overall function of some embodiments of the cycle as well as being key to the superior thermal efficiency of the overall cycle.

In the illustrated embodiment, the cooling circuit consists of a compressor 2, two heat exchanger units—one for absorbing energy from the working liquid coming from the outlet of the expander 3, and one for the transfer of absorbed energy into the water circulation system 18, and a Pressure Reduction Valve (PRV) 14. The cooling circuit functions as a standard refrigeration cycle where the cooling fluid (typically a commercial fluid such as R134a, R290 or other common refrigeration fluids) operates in substantially a vapor phase (can also be mixed—liquid to vapor) where the vapor is first compressed to about 50-about 1000 psi in the recuperator compressor 2. The cooling fluid then exits at elevated temperatures and it then passes through the heat exchanger 18, also referred to herein as a "second heat exchanger", where energy is given up to the storage/water circuit (energy is absorbed by the flow of water coming from the storage system), thereby retaining the recovered thermal energy in the system for reuse. The cooling fluid then leaves the heat exchanger 18 at reduced temperatures and passes through the PRV valve 14 where the pressure is substantially reduced causing the cooling fluid to further expand effectively causing a significant drop in temperature. The cooling fluid then travels through heat exchanger 3 at reduced temperatures where it absorbs energy from the exhaust flow of the working liquid coming from the outlet of the expander—thus cooling the working liquid fluid traveling from the expander 12 to the reservoir 15. The cooling fluid is then re-compressed in compressor 2 and repeats the cooling cycle. Compressor 2 is throttled (via the use of a Variable Frequency Drive or hydraulic flow valve controlled by a PLC) to deliver the required amount of cooling fluid to cool the working liquid coming from expander 12 and traveling through heat exchanger 3 and then to the reservoir 15.

Figure 3:
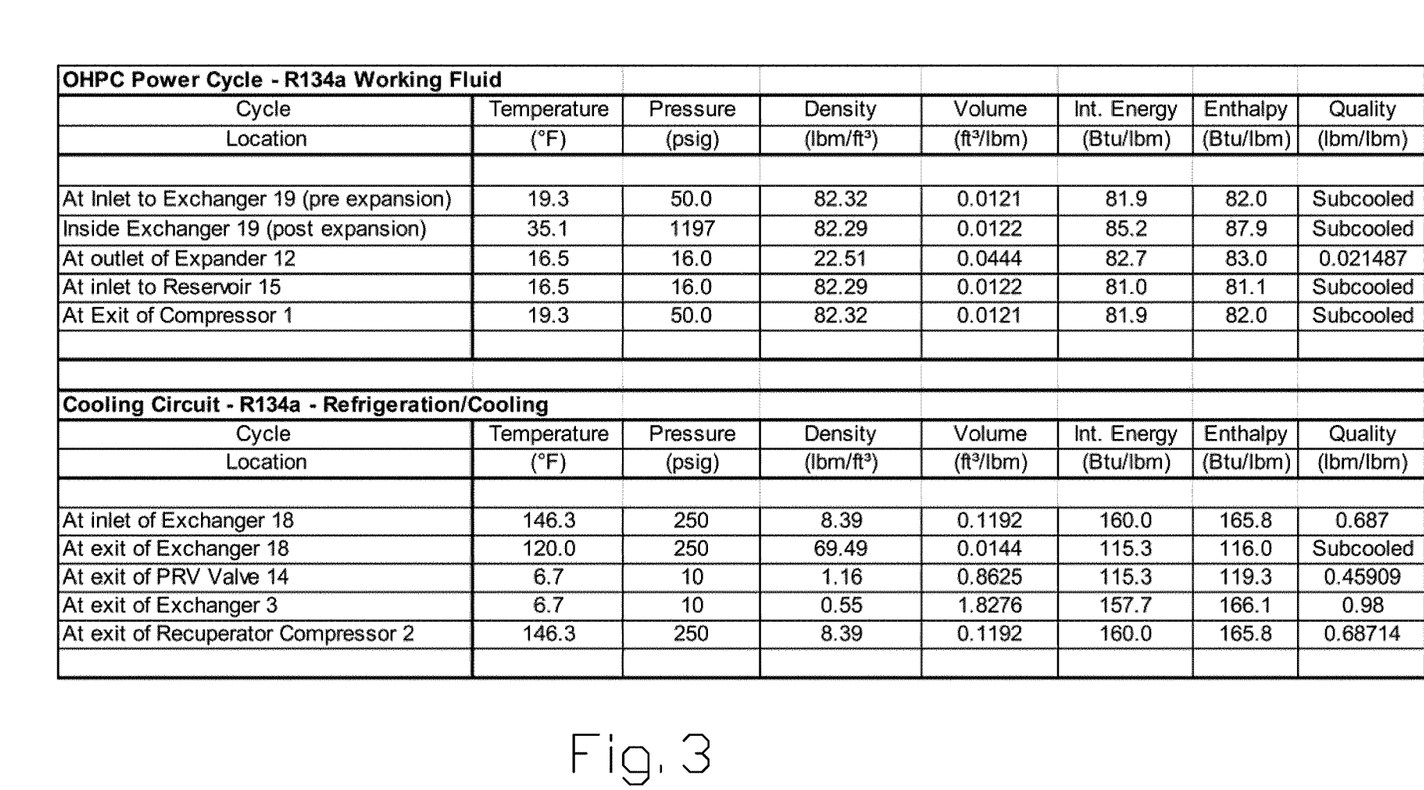
FIG. 3 is a table showing an example of working liquids physical properties (in this case R134a) and the changes to those properties at various locations and times during the cycle of operation of the system of FIG. 1.
Figure 4:
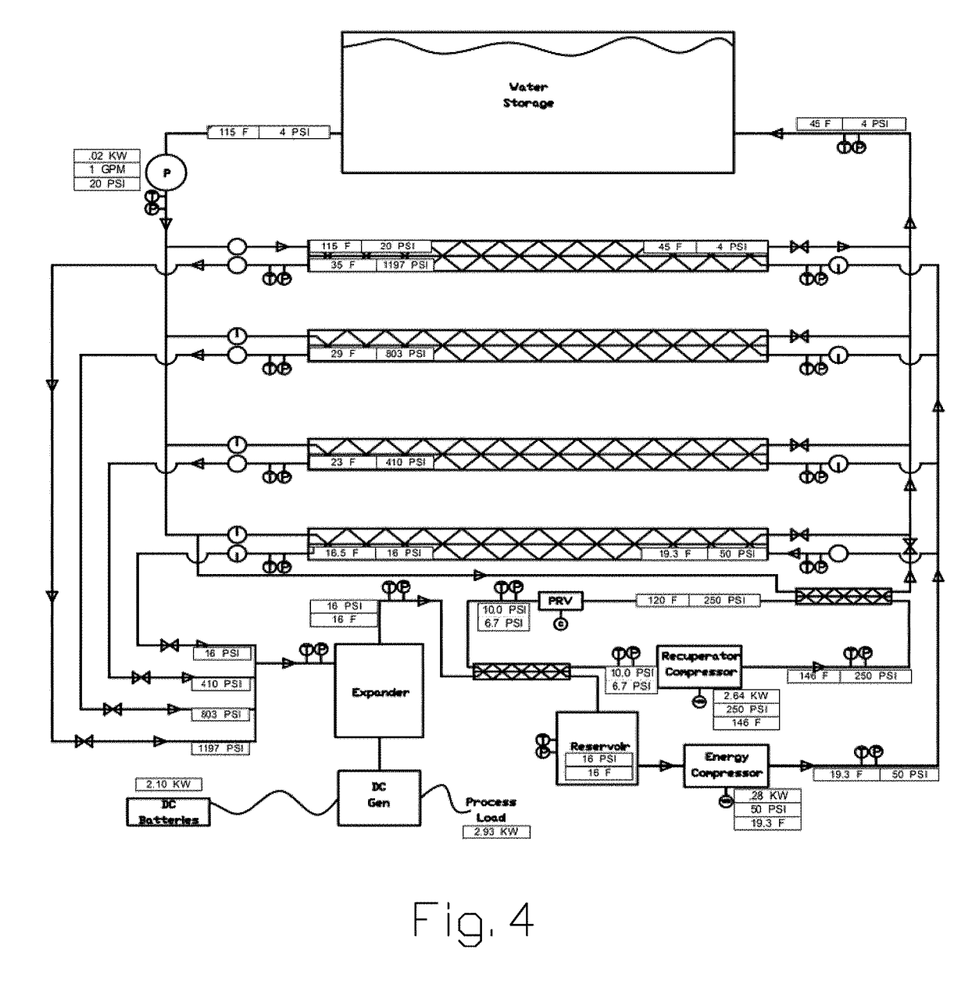
FIG. 4 is a process flow diagram showing an example of the working fluid conditions at various locations in a hydraulic pulse cycle according to an embodiment of the present invention.

While examples of the working liquid have been described herein, other liquid or supercritical working fluids would be suitable for use in the present invention. The present invention operates at least in part on the principle that liquids are generally not compressible. Therefore, according to the present invention, the working fluid does not completely change phase to a gas during the operation of the expander. Any fluid that undergoes an expansion or contraction with a change in temperature may be utilized according to the present invention. Among the characteristics that may be considered in selecting a working fluid are the coefficient of expansion, the ability to absorb energy, and the speed at which heat is transferred to the fluid. For example, if a liquid quickly absorbs energy, the speed of the system may be faster. However, in some cases, a liquid that quickly responds to changes in temperature may have a low coefficient of expansion. Therefore, these factors must be balanced in order to achieve the desired effect for the expander. FIGS. 3 and 4 provide examples of these factors at various locations throughout an embodiment of the hydraulic pulse cycle system. Other factors that may be considered in selecting a working fluid include any caustic effects that the fluid may have on the apparatus through which it travels, the environment, and/or people working with the system.

Referring to FIG. 4, there is a process flow diagram showing a working fluid conditions at various locations in the hydraulic pulse cycle according to an embodiment of the present invention. The pressure and temperature differences shown therein demonstrate specific points along the pressure gradient that each exchanger will go through from high pressure to low pressure as the exchanger discharges into the expander(s) over a very short interval. This happens very quickly from high pressure to low pressure—around a 1-10 second interval. The four exchangers are timed in sequence—ie: #1 is opened to expander and discharges from high pressure to low pressure. Once the #1 pressure sensor see's the low set-point (meaning exchanger #1 is empty or exhausted), the #1 discharge valve is close and #1 goes into the recharge phase. At the same moment, #2 discharge valve opens and the cycle is identical—then #3, then #4 and then back around to #1. The total duration of the loop is approximately 4-40 seconds or less depending on the flow and output of the system. Hence, the pulse characteristics of the cycle.

Figure 5:
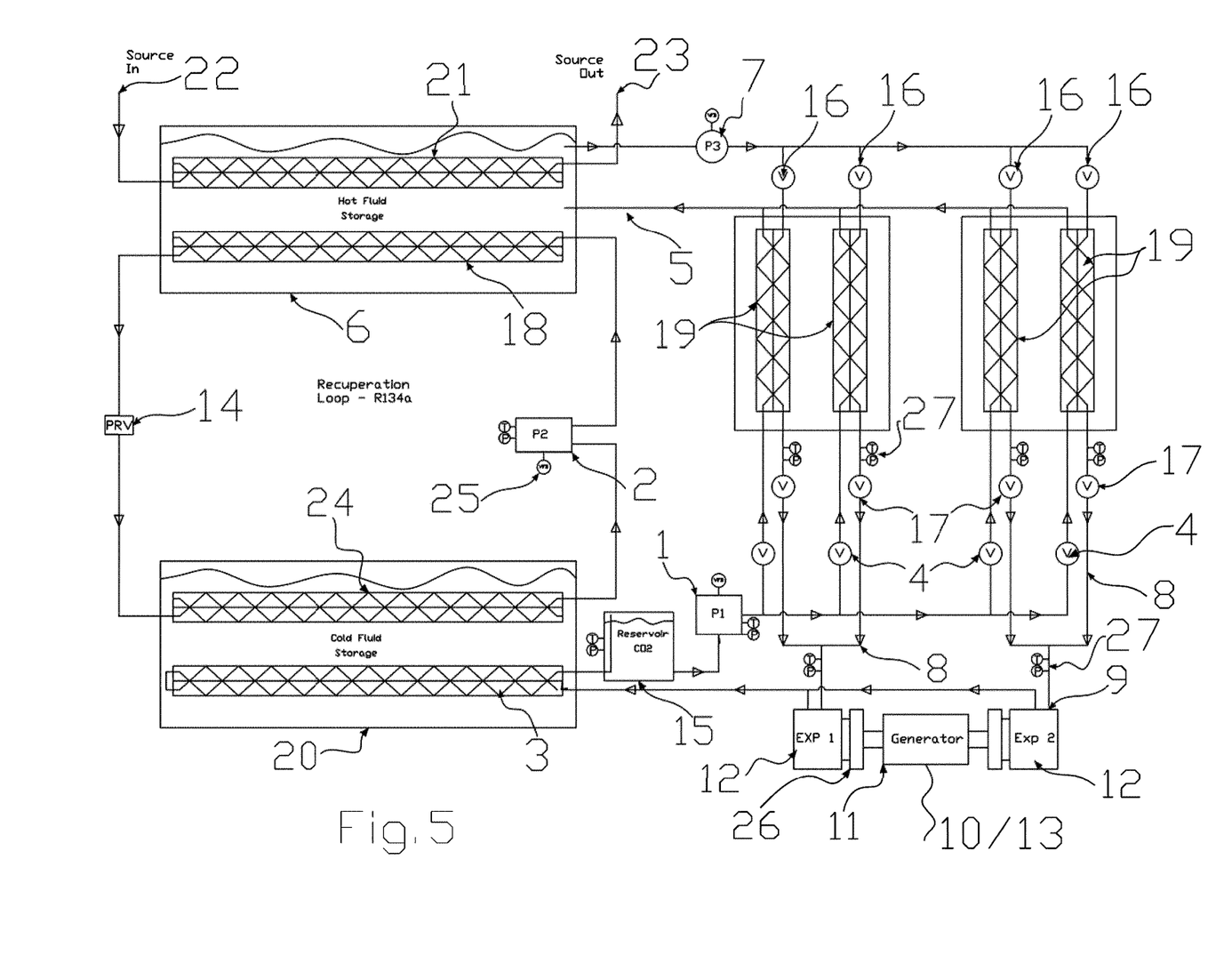
FIG. 5 is a process flow diagram of another embodiment of an emission-less power extraction system utilizing a hydraulic pulse cycle for the conversion of thermal energy into electricity from sources such as natural water bodies (oceans, lakes, rivers), solar, wind, waste heat, geothermal, biomass oxidation and conventional fuels, according to another embodiment of the present invention.

Referring to FIG. 5, there is shown another embodiment of a hydraulic pulse cycle in accordance with the present invention. Energy enters the system via conduit 22 in the form of hot collection fluid from a thermal source, preferable in the form of a collection liquid at a temperature range of about 180° F. to about 200° F. The flow of thermal energy into the cycle is achieved via the circulation of the hot collection fluid and can be delivered from any number of sources including large engine waste heat recovery, industrial stack waste heat recovery, concentrated solar energy heating fluid, wind energy transferring kinetic wind energy to heating fluid, shallow low-grade geothermal energy, and the like.

Cooled working fluid is drawn from the working fluid reservoir 15 by pump 1, which may be any commercially available centrifugal, scroll or plunger pump unit such as those made by Cat Pumps of Minneapolis, Minn. The working fluid then travels from the outlet of pump 1 to the inlet of two of the four heat exchangers 19 shown in FIG. 5, and under a set pressure regulated by a system programmable logic controller (PLC) that controls a variable-frequency drive (VFD) affecting speed control of the drive motor to pump 1. The PLC and VFD employed may be any appropriate commercially available unit that would receive temperature and pressure information from commercially available temperature and pressure transducers shown at 27, such as sold by the WIKA group of companies and the like.

During a complete cycle, each of the heat exchangers 19 alternate between at least three distinct modes. In the recharge mode, valve 4 is open and valve 17 is closed, the internal pressure of heat exchanger 19 is at the lowest point of the cycle, and the working fluid is also in a low pressure and sub cooled state. Under these conditions the recharge pump 1 transfers working fluid from the reservoir 15 and 'recharges' the specific heat exchanger(s). During the recharge mode, the respective valve 16 remains closed eliminating an incoming thermal energy to the heat exchanger during recharge. In the configuration shown in FIG. 5, there are four valves 16, which effectively control the flow of hot fluid from storage tank 6 being pumped by pump 7 and flowing across the low-pressure side or non-working fluid side of heat exchangers 19. This sequence allows for the recharge of each heat exchanger 19 at the lowest possible pressure and temperature minimizing the amount of parasitic work required by pump 1.

The second mode is the pressurize mode where the appropriate valves 4 and 17 are both closed and the appropriate valve 16 is opened allowing hot collection fluid to circulate between pump 7 through the outside of the heat exchanger 19 and back to the hot storage tank 6 thereby coming into contact with the outside surface of heat exchangers 19 resulting in the transfer of thermal energy from the hot collection fluid into the working fluid via conduction through the wall of heat exchanger 19. The thermal or hot collection fluid can be water, brackish water, saline water, water glycol or any other inert liquid capable of storing thermal energy and having a boiling temperature above about 210° F. As the thermal energy transfers from the hot collection fluid into the working fluid, the pressure and temperature of the working fluid rapidly increase, and in some cases can reach pressures in excess of 5,000 psi or even 8000 psi.

The third mode is the discharge or power mode whereby, after the pressurize mode, valve 17 of the appropriate exchanger 19 is opened allowing for the high pressure and temperature working fluid to travel via conduit 8 into the inlet of the respective expander 12. The high pressure/high temperature working fluid travels through the specific type of expander being used in the system, where work is then extracted by the expander in the form of mechanical energy rotating an output shaft that can then be used to drive any mechanical processes or to drive an electrical generator. There are various types of commercial expanders that may be used with the system, including without limitation, plunger, in-line piston, rotary piston, axial turbine, vane turbine, tesla turbine, and regenerative turbine.

As work is extracted from the working fluid via the function of the expander being employed, the working fluid exits the expander 12, and due to the extraction of work energy via the expander, it experiences a significant expansion, and pressure and temperature drop as thermal energy is converted to mechanical work. The lower pressure, expanded and cooled working fluid then flows via appropriate piping, such as for example stainless steel tubing commercially available from companies such as DKLok and the like, to heat exchanger 3 where it is further cooled resulting in a complete subcooled state. Heat exchanger 3 effectively serves to transfer the excess energy contained in the working fluid into the cold fluid stored in reservoir 20. As the excess energy is transfer into the cold fluid the working fluid is fully condensed to a sub cooled liquid and enters reservoir 15 where it is drawn into pump 1 then being at the top of the cycle.

FIG. 5 show a configuration utilizing two 'sets' of heat exchangers 19 and two expanders 12. In any configuration, a PLC will control the timing and sequencing of the three modes making up a complete cycle in such a way as to even the torque oscillation being delivered to generator 11 via each freewheeling clutch system 26. This offset of the peak and low points of at least two expanders sets driving the generator 11 serves to even out the pulse effect or oscillation experienced by the generator input shaft. In other configurations, there could be any number of expanders or expander sets, coupled to a single or multiple generators via various drive arrangements, providing for an essentially even flow of torque/work to the generator shaft(s) while each expander would be delivering its share of the work via the distinct pulse characteristic of the thermal cycle. A freewheel clutch system 26 can be any commercially available type mechanism capable of allowing the employed expander to de-couple from the generator on the low side of its pulse as the expanders RPM drops below the static RPM of the generator shaft and then to instantly recouple the generator shaft at the beginning of the pulse during which work is delivered via high torque and rpm.

To enhance overall thermal efficiency, the system employs an energy recuperation circuit. The working fluid travels through exchanger 3 where it gives up its excess thermal energy to the cold fluid in storage 20. A separate recuperation circuit employing a second refrigeration fluid, preferably a refrigerant fluid such as R134a, is circulated through heat exchanger 24 via pump 2 causing the fluid to flow, under a set pressure, through heat exchanger 18. The recuperation fluid is held at a target pressure as it flows through heat exchanger 18 via the backpressure function of pressure reduction valve (PRV) 14. This PRV is PLC controlled by the system to hold the appropriate pack pressure on the refrigerant to achieve an elevated temperature in the refrigerant passing through the inside of heat exchanger 18. Preferably the temperature of the refrigerant would maintain a temperature delta adequate to transfer excess thermal energy from the refrigerant to the collection fluid. The hot collection or storage fluid is stored at a temperature around 180° F. which allows energy to transfer from the higher temperature refrigerant into the hot fluid in storage 6 effectively cooling or dropping the temperature and energy content in the refrigerant as it exits heat exchanger 18 and flows toward PRV 14. As the refrigerant passes through PRV 14, the pressure is substantially reduced resulting in a temperature drop as the refrigerant flows into heat exchanger 24. As the low pressure and cooled refrigerant flows through exchanger 24, it absorbs thermal energy from the cool fluid in storage 20. This exchange results in the refrigerant increasing in energy content and corresponding temperature, while remaining in a substantially liquid state, as it is drawn into the inlet of pump 2. The above described cycle effectively recuperates the excess energy entrained in the working fluid from the power cycle as it exits expanders 12 as well as the work energy coming in from refrigerant pump 2, back into the hot fluid storage 6 at a thermal quality and temperature level appropriate to be returned into the power side of the cycle via pump 7, via valve 16 and through exchangers 19 and into the working fluid during the pressurize mode of the cycle.

Figure 6:
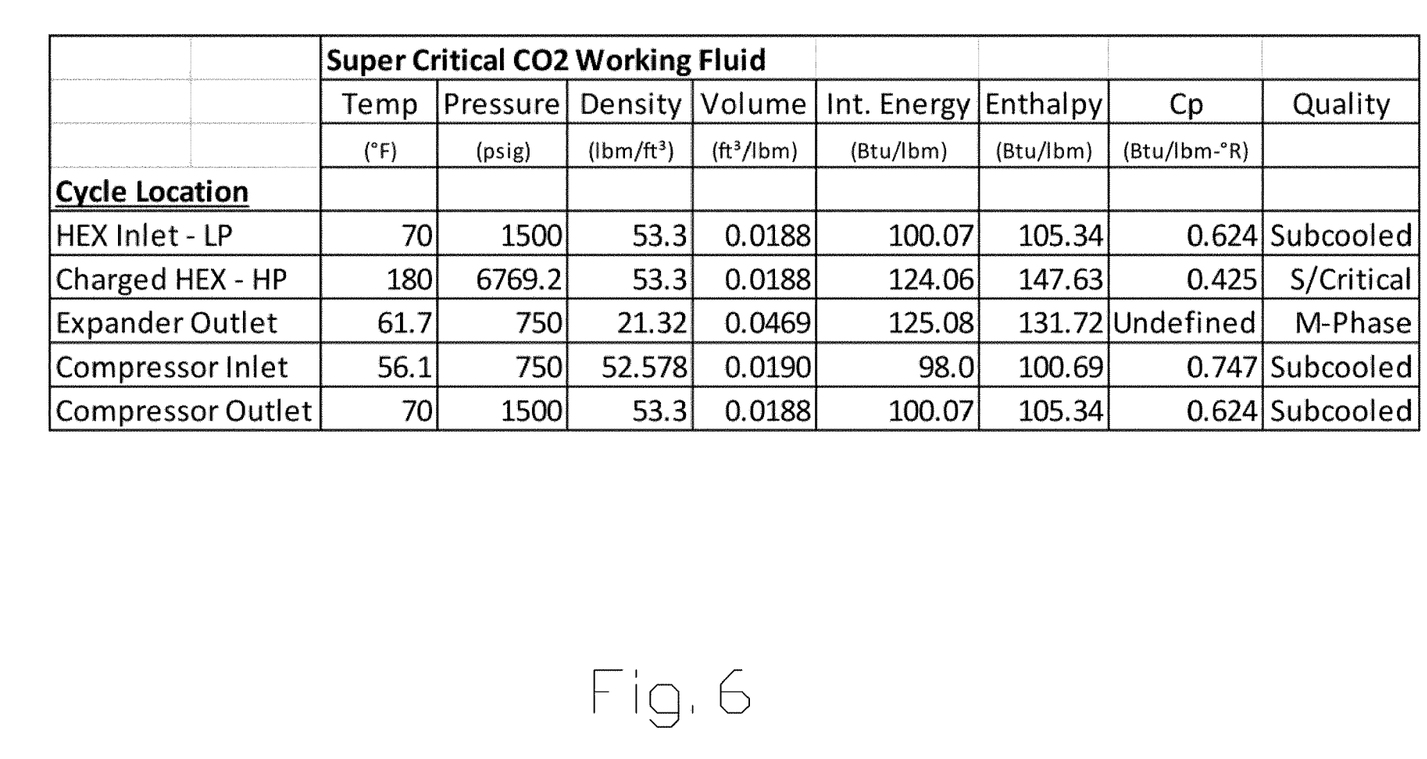
FIG. 6 is a table showing an example of working liquids physical properties (in this case $CO_2$) and the changes to those properties at various locations and times during the cycle of operation of the system of FIG. 5.

Referring to FIG. 6, there is shown a table exemplifying using $CO_2$ as the working fluid and showing its physical properties and the changes to those properties at various locations and times during the cycle of operation of the system described in FIG. 5.

While the above description and illustrations constitute preferred or alternate embodiments of the present invention, it will be appreciated that numerous variations may be made, such as altering the perimeter shape, without departing from the scope of the invention. It is intended that the invention be construed as including all such modifications and alterations.

The invention claimed is:

1. A process of extracting useful work or electricity from a thermal source, the process comprising the steps of:
   (a) filling a first side of a first heat exchanger with a liquid or supercritical working fluid;
   (b) closing fluid flow in and out of the first side of the first heat exchanger such that a fixed volume of the working fluid is maintained in the first side;
   (c) providing a flow of a collection fluid, that is at a higher temperature than the working fluid as a result of heat from the thermal source, through a second side of the first heat exchanger that is adjacent to the first side to affect a transfer of heat from the collection fluid to the fixed volume of the working fluid to raise its temperature and pressure;
   (d) releasing the pressurized working fluid from the first side of the first heat exchanger upon the working fluid reaching a threshold state;
   (e) directing a flow of the pressurized working fluid to an expander capable of converting the kinetic energy of the pressurized working fluid into useful work or electricity;
   (f) providing a cooling conduit comprising a cooling fluid circulating therein, a compressor that compresses the cooling fluid, a second heat exchanger downstream of the compressor, a pressure reduction valve downstream of the second heat exchanger that expands the cooling fluid, and a third heat exchanger downstream of the pressure reduction valve;
   (g) directing a flow of the collection fluid through the second heat exchanger such that the collection fluid absorbs heat from the cooling fluid; and
   (h) directing a flow of the working fluid after it exits the expander through the third heat exchanger such that the cooling fluid absorbs heat from the working fluid.

2. The process as claimed in claim 1 wherein the collection fluid is a collection liquid, and the process further includes transferring heat energy from the thermal source to the collection liquid.

3. The process as claimed in claim 2 wherein the collection liquid is heated to a temperature within the range of 34° F. to 210° F. to yield a heated collection liquid.

4. The process as claimed in claim 1 wherein the working fluid at step (a) is at a pressure in the range of 50 to 5000 psi and at a temperature in the range of −10° F. to 210° F.

5. The process as claimed in claim 1 wherein the working fluid becomes supercritical during step (c), and after step (e) the working fluid is 50% to 90% or more in a liquid phase.

6. The process as claimed in claim 1 further comprising the step of recirculating the working fluid to the first side of the first heat exchanger.

7. The process as claimed in claim 6 further comprising the step of recirculating the collection fluid to the second side of the first heat exchanger.

8. The process as claimed in claim 1 wherein at step (h) the working fluid is cooled to within the range of −10° F. to 210° F.

9. The process as claimed in claim 1 further comprising performing steps (a)-(e) on a plurality of first heat exchangers, each in fluid communication with the expander, and temporally offsetting the release of the pressurized working fluid from at least one of the plurality of first heat exchangers to the expander.

10. A system for extracting useful work or electricity from a thermal source, the system comprising:
   a. a first heat exchanger having a first side and an adjacent second side that is fluidly separate from the first side;
   b. a supply of a liquid or supercritical working fluid that is fluidly coupled to the first side of the first heat exchanger;
   c. a valve system operable to close flow of working fluid in and out of the first side in response to a close signal to enclose a volume of working fluid within the first side, and being further operable to open flow of working fluid out of the first side in response to an open signal;
   d. a flow of a collection fluid through the second side of the first heat exchanger, wherein the collection fluid is at a higher temperature than the working fluid as a result of heat from the thermal source, the flow of collection fluid operable to affect a transfer of heat from the collection fluid to the volume of working fluid within the first side to raise its temperature and pressure;
   e. a controller operable to send the close signal to the valve system when the first side of the first heat exchanger is full of working fluid, and operable to send the open signal to the valve system upon the working fluid reaching a threshold state to release the pressurized working fluid from the first side of the first heat exchanger;
   f. an expander fluidly coupled to the first side of the first heat exchanger to receive the pressurized working fluid and operable to convert the kinetic energy of the pressurized working fluid into useful work or electricity; and
   g. a cooling conduit comprising: a cooling fluid circulating therein; a compressor that compresses the cooling fluid; a second heat exchanger in fluid communication with the cooling fluid downstream of the compressor and in fluid communication with the collection fluid, the second heat exchanger operable to transfer heat from the cooling fluid to the collection fluid; a pressure reduction valve downstream of the second heat exchanger that expands the cooling fluid; and a third heat exchanger in fluid communication with the cooling fluid downstream of the pressure reduction valve and in fluid communication with the working fluid downstream of the expander, the third heat exchanger operable to transfer heat from the working fluid to the cooling fluid.

11. The system as claimed in claim 10 wherein the collection fluid is a collection liquid at a temperature within a range of 34° F. to 210° F. as a result of heat from the thermal source.

12. The system as claimed in claim 10 wherein the working fluid is at a pressure in the range of 50 to 5000 psi and at a temperature in the range of −10° F. to 210° F.

13. The system as claimed in claim 10 further comprising a first recirculation conduit to recirculate the working fluid from the third heat exchanger to the first side of the first heat exchanger.

14. The system as claimed in claim 10 wherein the third heat exchanger is operable to cool the working fluid to a temperature in the range of −10° F. to 210° F.

15. The system as claimed in claim 10 further comprising a plurality of first heat exchangers, each having a first side that receives a flow of working fluid and a second side that receives a flow of collection fluid, and each first side being in fluid communication with the expander and operably connected to the valve system, and the controller is operable to send open signals to the valve system in a manner to temporally offset the release of pressurized working fluid from at least one of the plurality of first heat exchangers to the expander.

* * * * *